US007328375B2

(12) United States Patent
Gupta et al.

(10) Patent No.: US 7,328,375 B2
(45) Date of Patent: Feb. 5, 2008

(54) PASS THROUGH DEBUG PORT ON A HIGH SPEED ASYNCHRONOUS LINK

(75) Inventors: Ashish Gupta, San Jose, CA (US); Bahaa Fahim, Sunnyvale, CA (US); Kent Dickey, Westford, MA (US); Jonathan Jasper, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 10/749,660

(22) Filed: Dec. 30, 2003

(65) Prior Publication Data

US 2005/0149705 A1 Jul. 7, 2005

(51) Int. Cl.
*G06F 11/00* (2006.01)

(52) U.S. Cl. ............................ 714/45; 714/30; 714/31

(58) Field of Classification Search .................. 714/31, 714/45, 30

See application file for complete search history.

(56) References Cited

U.S. PATENT DOCUMENTS 6,300,787 B1 10/2001 Shaeffer et al.
6,647,444 B2 11/2003 Lueker
6,715,094 B2 3/2004 Jacobs
6,973,593 B1 * 12/2005 Zani et al. .................... 714/31
2003/0048209 A1 3/2003 Buchanan et al.
2003/0061527 A1 3/2003 Haycock et al.
2004/0210804 A1 * 10/2004 Kimelman et al. ......... 714/724
2004/0221201 A1 * 11/2004 Seroff .......................... 714/30

FOREIGN PATENT DOCUMENTS

JP 09 008758 A 5/1997

OTHER PUBLICATIONS

Wikipedia—http://en.wikipedia.org/wiki/Packet.*
International Search Report mailed Mar. 24, 2006. 6 pages.
Written Opinion of the International Searching Authority. 6 pages.

* cited by examiner

*Primary Examiner*—Yolanda L Wilson
(74) *Attorney, Agent, or Firm*—Philip A. Pedigo

(57) ABSTRACT

An example computer system includes a first bridge device that includes an interface controller. The interface controller combines debug information generated within the bridge device with a training pattern. The first bridge device is coupled to a second bridge device via a high-speed asynchronous interconnect. The first bridge device converts the debug information and training pattern into a packet to be transmitted over the interconnect to the second bridge device. The training pattern serves to allow the second bridge device to maintain bit and symbol synchronization during the transfer; of the debug information.

17 Claims, 3 Drawing Sheets

Training Pattern 201
Train Counter 210
Normal Memory Interface Traffic 203
Debug Info Assembly 240
250
Serializer 220
Memory Interface 115
Debug Data 205
Control Packet Sequence 230

PASS THROUGH DEBUG PORT ON A HIGH SPEED ASYNCHRONOUS LINK

FIELD OF THE INVENTION

The present invention pertains to the field of computer systems. More particularly, this invention pertains to the field of communicating debug information between components within a computer system.

BACKGROUND OF THE INVENTION

The ability to debug computer system components is an important capability that allows computer system component engineers and technicians to identify problems and to improve their products. Many computer system components include circuitry to generate debug information that can be delivered to a debug port that may include several pins on the components. The debug information can be accessed by observing the activity on the pins with a logic analyzer. A disadvantage of this approach is that several, perhaps as many as 16 or more, pins are needed for the debug port. The addition of these pins for a debug port results in increased die and package size, as well as component cost and lower silicon yield.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, one embodiment of a computer system includes a first bridge device that includes an interface controller. The interface controller combines debug information generated within the bridge device with a training pattern. The first bridge device is coupled to a second bridge device via a high-speed asynchronous interconnect. The first bridge device converts the debug information and training pattern into a packet to be transmitted over the interconnect to the second bridge device. The training pattern serves to allow the second bridge device to maintain bit and symbol synchronization during the transfer of the debug information. The second bridge device receives the packet of combined debug information and training pattern and separates the debug information from the training pattern. The debug information may then be output to a memory bus where the debug information can be observed by a logic analyzer.

Figure 1:
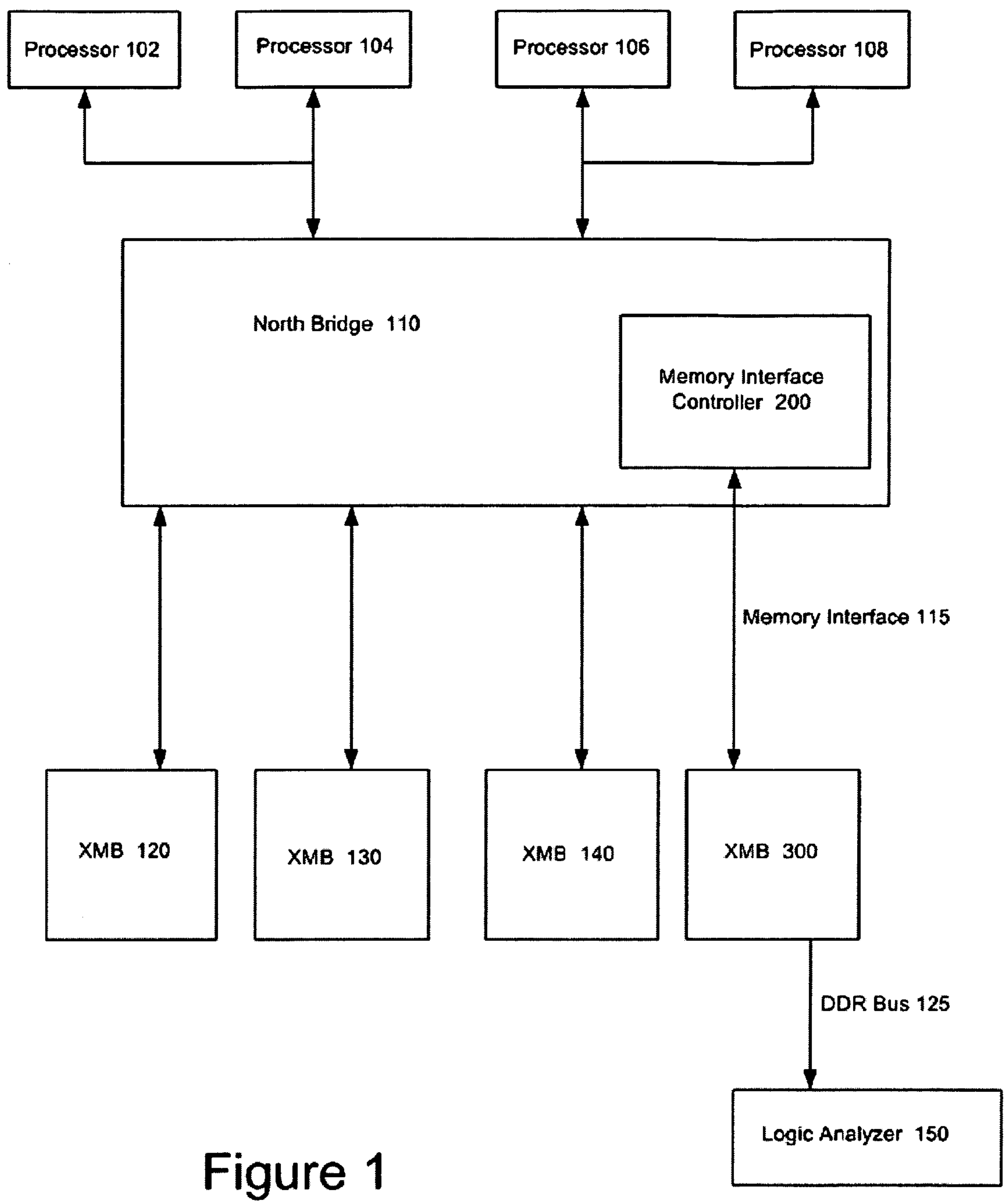
FIG. 1 is a block diagram of one embodiment of a computer system including a north bridge having a memory interface controller coupled to an extended memory bridge.

FIG. 1 is a block diagram of one example embodiment of a computer system 100 including a north bridge 110 having a memory interface controller 200 coupled to an extended memory bridge (XMB) 300 via a memory interface bus 115. The memory interface 115 is a high-speed asynchronous link. For this example embodiment, the memory interface 115 is 10 bits wide and operates at a clock speed in the range of 2.1-3.2 GHz. The computer system 100 includes processors 102, 104, 106, and 108 coupled to the north bridge 110. The north bridge is further coupled to XMBs 120, 130, and 140. Each of the XMBs may be coupled to memory devices. The XMB 300 is coupled to a double data rate (DDR) memory bus 125.

The example computer system 100 is only one of a wide variety of possible computer system configurations. Further, although the embodiments described herein discuss a DDR memory bus, other embodiments are possible with other memory types.

The north bridge 110 includes circuitry (not shown) for generating debug information. Any of a wide variety of techniques and methods for generating or gathering debug information are possible in this embodiment. The interface controller 200 combines the generated debug information and a training pattern into a packet for transmission over the DDR bus 125 to the XMB 300. Because the memory interface 115 is asynchronous (the clock information is derived from edge transitions in the transmitted data), a training pattern is transmitted with the debug information in order to ensure that enough data transitions occur on the 10 wires of the interface 115 to allow the XMB 300 to maintain bit and symbol synchronization during the transfer of the debug information.

Before the memory interface controller 200 can deliver the debug information to the XMB 300, it first transmits a series of control packets that alert the XMB to the impending transfer of debug information. For this example embodiment, the debug information transfer is accomplished outside of the normal memory interface protocol. The XMB 300 therefore needs to be informed as to when the debug information transfer is to take place so that the XMB 300 can treat the received information appropriately.

The control packets that are transmitted from the memory interface controller 200 to the XMB 300 may be formatted like that shown in Table 1, below.

TABLE 1

Control Packet Formatting

| W9 | W8 | W7 | W6 | W5 | W4 | W3 | W2 | W1 | W0 |
|---|---|---|---|---|---|---|---|---|---|
| CRC | CRC | CRC | | | Control Packet | | | | 10 |
| CRC | CRC | CRC | | | Control Packet | | | | 9 |
| CRC | CRC | CRC | | | Control Packet | | | | 8 |
| CRC | CRC | CRC | | | Control Packet | | | | 7 |
| CRC | CRC | CRC | | | Control Packet | | | | 6 |
| CRC | CRC | CRC | | | Control Packet | | | | 5 |
| CRC | CRC | CRC | | | Control Packet | | | | 4 |
| CRC | CRC | CRC | | | Control Packet | | | | 3 |
| CRC | CRC | CRC | | | Control Packet | | | | 2 |
| CRC | CRC | CRC | | | Control Packet | | | | 1 |

Table 1 shows 10 control packets that are to be sent consecutively from the memory interface controller 200 to the XMB 300. Bit 0 (WO, with "W" representing "wire") of each of the packets includes an offset number that tells the XMB how many control packets will be issued before transmission of the debug information packets. For example, if the value at the WO position is a 1, then the XMB should expect that the next packet will be debug information. The offset value begins at 10 and counts down with each successive control packet. The multiple control packets are sent in order to ensure that at least one of the packets will be transmitted and received without error. There is no reply mechanism for the XMB 300 to indicate a successful transmission, so the multiple packets provide redundancy to ensure at least one control packet is received without error. Each of the control packets includes several cyclic redundancy check (CRC) bits to allow the XMB 300 to determine whether the packets are successfully received.

For this example embodiment, the debug and training pattern information is organized into 80 bit packets, where 72 bits are debug information and 8 bits are the training pattern. Table 2 below shows one possible way to organize the debug and training information packets (10 packets are shown).

TABLE 2

Debug and Training Information Packet Organization

| W9 | W8 | W7 | W6 | W5 | W4 | W3 | W2 | W1 | W0 |
|---|---|---|---|---|---|---|---|---|---|
| Train | 71:64 | 62:56 | 55:48 | 47:40 | 39:32 | 31:24 | 23:16 | 15:8 | 7:0 |
| 71:64 | Train | 62:56 | 55:48 | 47:40 | 39:32 | 31:24 | 23:16 | 15:8 | 7:0 |
| 63:56 | 71:64 | Train | 55:48 | 47:40 | 39:32 | 31:24 | 23:16 | 15:8 | 7:0 |
| 55:48 | 71:64 | 62:56 | Train | 47:40 | 39:32 | 31:24 | 23:16 | 15:8 | 7:0 |
| 47:40 | 71:64 | 62:56 | 55:48 | Train | 39:32 | 31:24 | 23:16 | 15:8 | 7:0 |
| 39:32 | 71:64 | 62:56 | 55:48 | 47:40 | Train | 31:24 | 23:16 | 15:8 | 7:0 |
| 31:24 | 71:64 | 62:56 | 55:48 | 47:40 | 39:32 | Train | 23:16 | 15:8 | 7:0 |
| 23:16 | 71:64 | 62:56 | 55:48 | 47:40 | 39:32 | 31:24 | Train | 15:8 | 7:0 |
| 15:8 | 71:64 | 62:56 | 55:48 | 47:40 | 39:32 | 31:24 | 23:16 | Train | 7:0 |
| 7:0 | 71:64 | 62:56 | 55:48 | 47:40 | 39:32 | 31:24 | 23:16 | 15:8 | Train |

The 80 bit packets are sent 10 bits at a time for 8 consecutive clock periods. 10 packets are sent consecutively. The 8 bits of training information are moved to a different wire for each packet, thereby ensuring that each wire receives a training pattern during the string of 10 packets.

The training packets may also have an advantage of providing parity information for each of the packets. For example, an 8-bit training pattern of 1010_1010 can be transmitted if the parity for the packet is even, or a pattern of 0101_0101 can be transmitted if the parity for the packet is odd.

The XMB 300 receives the packet of combined debug information and training pattern and separates the debug information from the training pattern. The debug information may then be output to a memory bus 125 where the debug information can be observed by a logic analyzer 150.

Figure 2:
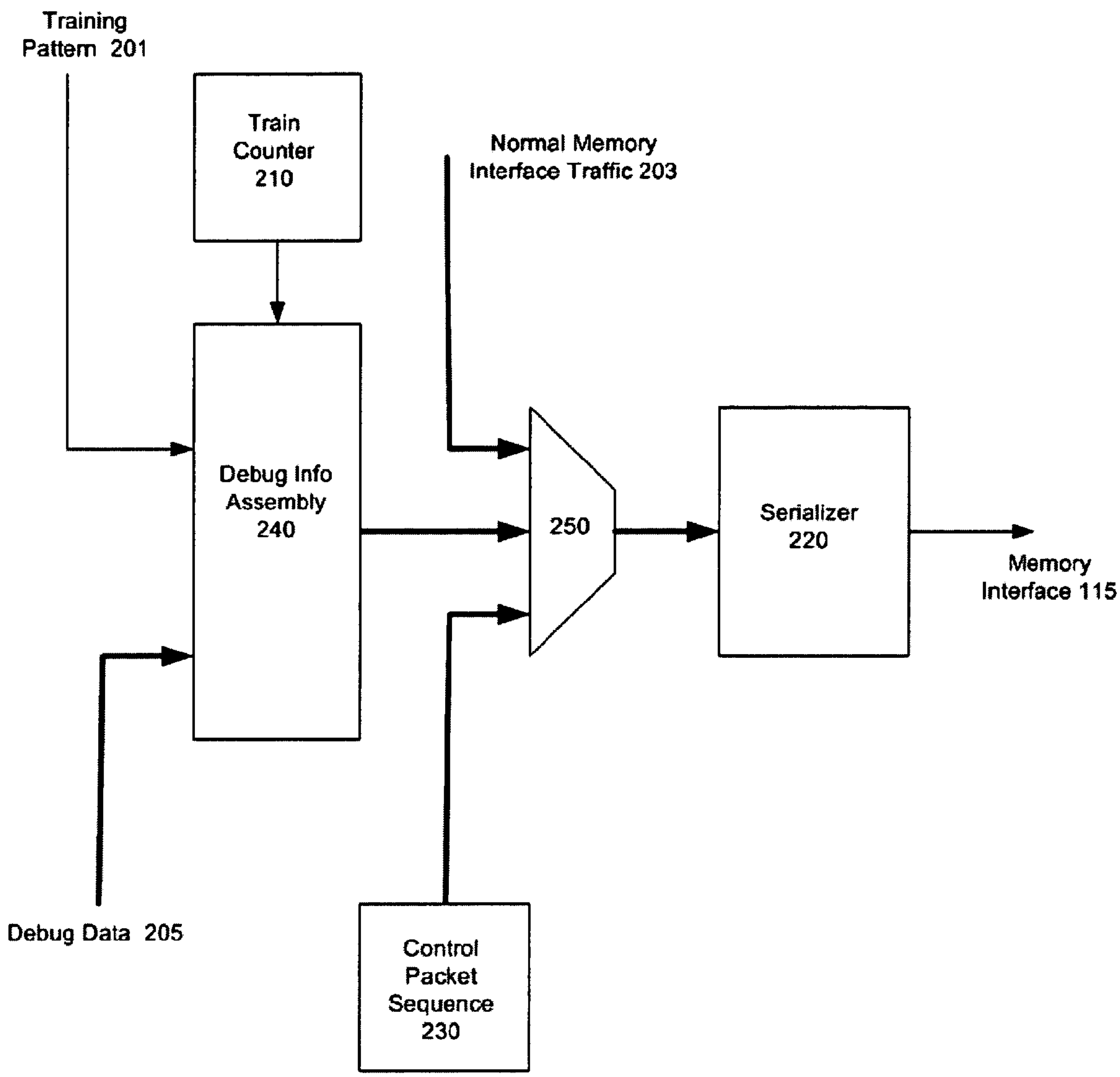
FIG. 2 is a block diagram of one embodiment of a portion of a memory interface controller.

FIG. 2 is a block diagram of one embodiment of a portion of the memory interface controller 200. A debug information assembly unit 240 receives a training pattern 201 and debug data 205. The assembly unit 240 also receives input from a train counter 210. The assembly unit 240 generates an 80-bit packet including 72 bits of debug information and 8 bits of training pattern. The training pattern is placed in an appropriate location according to position indicated by the train counter 210. The debug and training information packet is received by a multiplexer 250 which also receives normal memory interface traffic 203 and control packets from a control packet sequence unit 230. The output of the multiplexer 250 is delivered to a serializer unit 220. The serializer 220 takes the 80 bit packets and reduces them down to 10 wires for transfer across the memory interface 115.

Figure 3:
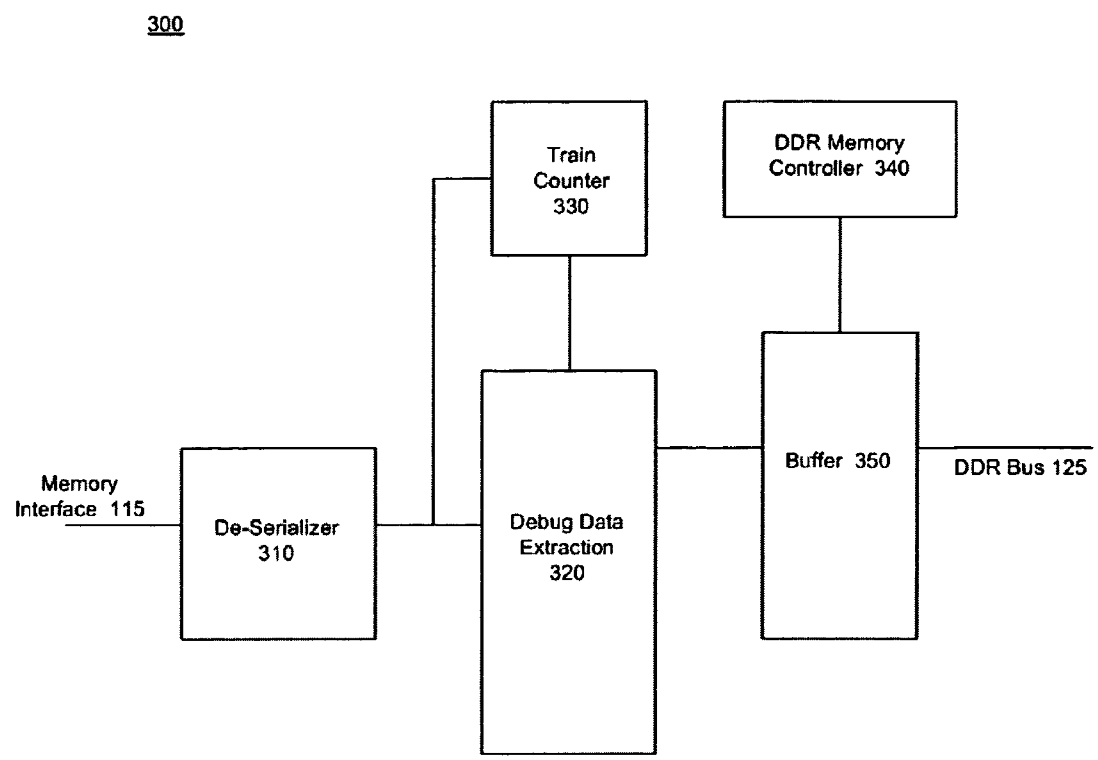
FIG. 3 is a block diagram of one embodiment of a portion of an extended memory bridge.

FIG. 3 is a block diagram of one embodiment of a portion of the extended memory bridge 300. A debug and training pattern packet is received over the memory interface 115 at a de-serializer unit 310. The de-serializer unit 310 delivers the received packet to a debug data extraction unit 320 that separates the debug data from the training data. A train counter 330 indicates to the debug data extraction unit the location of the training pattern for the current packet. The debug data is then delivered to a buffer 350. The debug buffer 350 allows for the case where the memory interface 115 operates at a different clock speed than the DDR bus 125. A DDR memory controller 340 drives the debug data located in the buffer 350 onto the DDR bus 125, where the data can either be stored in memory or viewed by a logic analyzer coupled to the DDR bus 125.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:

a circuit to generate a training pattern;

a debug circuit to generate debug information; and an information assembly unit to combine the training pattern with the debug information, wherein the training pattern is to enable a receiver of a combined training pattern and debug information to maintain bit and symbol synchronization.

2. The apparatus of claim 1, further comprising a serializer unit to serialize the combined debug and training pattern information.

3. The apparatus of claim 2, further comprising an output circuit to drive the combined debug and training pattern information onto an interconnect.

4. The apparatus of claim 3, the output circuit to drive the combined debug and training pattern information onto a high-speed asynchronous interconnect.

5. The apparatus of claim 4, the training pattern to include parity information.

6. The apparatus of claim 5, the serializer unit to reduce the debug and training pattern information down to 10 wires.

7. The apparatus of claim 6, the output circuit to output 10 bits at a time onto the interconnect.

8. The apparatus of claim 7, the debug and training pattern information organized into 80 bit packets, where 72 bits are debug information and 8 bits are training pattern information.

9. A system, comprising:

a transmitting device including a circuit to generate a training pattern, a debug circuit to generate debug information, an information assembly unit to combine the training pattern with the debug information, wherein the training pattern is to enable a receiver of a combined training pattern and debug information to maintain bit and symbol synchronization, and a serializer unit to serialize the combined training pattern and debug information; and a receiving device coupled to the transmitting device via an interconnect, the receiving device including an input circuit to receive the combined training pattern and debug information over an interconnect, and a de-serialization unit to receive the combined training pattern and debug information from the input circuit, and a data extraction unit coupled to the de-serialization unit to separate the debug information from the training pattern.

10. The system of claim 9, the transmitting device further including an output circuit to drive the combined training pattern and debug information onto the interconnect.

11. The system of claim 10, wherein the interconnect is a high-speed asynchronous interconnect.

12. The system of claim 11, the output circuit to output 10 bits at a time onto the interconnect.

13. The system of claim 12, the combined training pattern and debug information organized into 80 bit packets, where 72 bits are debug information and 8 bits are training pattern information.

14. A method, comprising:

combining debug information with a training pattern, wherein the training pattern is to enable a receiver of a combined training pattern and debug information to maintain bit and symbol synchronization;

serializing the combined training pattern and debug information to create a serialized training pattern and debug information; and outputting the serialized training pattern and debug information onto an interconnect.

15. The method of claim 14, wherein combining debug information with a training pattern includes combining debug information with a training pattern that includes parity information.

16. The method of claim 15, wherein serializing the combined training pattern and debug information includes reducing the combined training pattern and debug information down to 10 wires.

17. The method of claim 16, wherein outputting the serialized training pattern and debug information includes outputting 80 bit packets, wherein 72 bits are debug information and 8 bits are training pattern.

* * * * *